United States Patent [19]
Deufel et al.

[11] Patent Number: 5,927,930
[45] Date of Patent: Jul. 27, 1999

[54] MACHINE TOOL HAVING A WORKING SPACE

[76] Inventors: Karl Deufel, Fattengasse 3, Kolbingen, Germany, 78600; Anton Schweizer, Ulmenweg 4, Wurmlingen, Germany, 78573

[21] Appl. No.: 08/831,186

[22] Filed: Apr. 2, 1997

[30] Foreign Application Priority Data

Apr. 10, 1996 [DE] Germany ............ 196 14 143

[51] Int. Cl.⁶ .................................. B66F 11/00
[52] U.S. Cl. ............ 414/589; 414/728; 294/110.1
[58] Field of Search .................. 414/749, 728, 414/718, 3, 8; 294/90, 110.1, 88, 115, 106; 269/13, 14; 134/111, 200

[56] References Cited

U.S. PATENT DOCUMENTS

| | | | |
|---|---|---|---|
| 4,416,577 | 11/1983 | Inaba et al. | 414/226 |
| 4,687,400 | 8/1987 | Lichti | 414/8 |
| 4,999,895 | 3/1991 | Hirose et al. | 198/346.1 X |
| 5,092,734 | 3/1992 | Sakoda et al. | 414/728 X |
| 5,183,987 | 2/1993 | Aso et al. | 269/13 X |

FOREIGN PATENT DOCUMENTS

| | | |
|---|---|---|
| 0052149 | 5/1982 | European Pat. Off. . |
| 0289333 | 11/1988 | European Pat. Off. . |
| 0415153 | 3/1991 | European Pat. Off. . |
| 0573678 | 12/1993 | European Pat. Off. . |
| 2658146 | 7/1978 | Germany . |
| 2951565 | 7/1981 | Germany . |
| 3928680 | 3/1991 | Germany . |
| 4214893 | 11/1993 | Germany . |
| 4409532 | 9/1996 | Germany . |
| 2136768 | 9/1984 | United Kingdom ............ 414/3 X |

*Primary Examiner*—Donald W. Underwood

[57] ABSTRACT

A machine tool comprises a working space in which a receptacle for workpieces to be machined, which are exchanged after completion of a machining process, is provided. A removal mechanism for workpieces, which after completion of the machining process removes the machined workpiece from the receptacle and holds it ready at a distance therefrom for exchanging, is provided in the working space.

6 Claims, 3 Drawing Sheets

MACHINE TOOL HAVING A WORKING SPACE

BACKGROUND OF THE INVENTION

1. Field of the Invention

The present invention relates to a machine tool having a working space in which a receptacle for workpieces to be machined, which are exchanged after completion of a machining process, is provided.

2. Related Prior Art

Machine tools of this kind are known from the related art.

The known machine tools generally have cover panels by means of which the working space is closed off from the outside, in order to protect the environment and operating personnel from flying chips and cutting fluid. Provided in the cover panels is an opening, which can be closed off by an operator door, through which the workpieces to be machined are exchanged with already machined workpieces.

The known machine tools generally have a workpiece table on which a receptacle is provided for clamping the workpieces to be machined. When a machining process is complete, the operator door is opened either automatically or by an operator, the receptacle being opened either automatically or by manipulations on the part of the operator so that the workpiece can be removed.

The operator then first cleans the workpiece, still located on the receptacle, using a manually operated spray gun, and then removes it from the working space. Chips are then cleaned off the receptacle by the operator before a new workpiece is then, in a third operation, placed on the receptacle.

The operator must therefore reach into the working space a total of three times in order to exchange a workpiece. These operations are not only physically strenuous, but are also associated with considerable soiling, since the flushed workpiece must be removed by the operator directly from the receptacle and taken out of the working space. This results in soiling not only of the operator but also of the environment outside the machine tool, due to drips of cutting fluid.

In addition to physical exertion and soiling, a further disadvantage with machine tools of this kind is the fact that the aforementioned three operations are necessary in order to exchange a machined workpiece with a workpiece that is yet to be machined. Since these three manipulations are performed by hand, they constitute the speed-limiting step in determining workpiece-to-workpiece time. In the case of piecework in particular, this additionally places the operator under severe performance pressure, so that errors and negligence are unavoidable, especially in cleaning the workpiece and the receptacle.

A further disadvantage thus results because of manual operation in that when receptacles are not completely cleaned, remaining chips, for example, can prevent the newly clamped-in workpiece from sitting correctly in the receptacle, so that deviations in machining accuracy occur.

Some of these disadvantages can be avoided by using automatic workpiece changing mechanisms, although these are associated with a whole series of disadvantages. In addition to the very high cost factor, these workpiece changing mechanisms also constitute a disadvantage in that they require highly qualified personnel, the acceptance of these highly automated machine tools being, in practice, relatively low.

A further disadvantage with automatic workpiece changers lies in the fact that said workpiece changers operate through the usual operator door, so that in the event of maintenance work on the machine tool, there is not only the danger of collisions with the workpiece changing mechanism, but the accessibility of the working space is also considerably degraded by such mechanisms.

SUMMARY OF THE INVENTION

In view of the above, it is an object of the present invention to improve the machine tool mentioned at the outset in such a way that with little design complexity, rapid and reliable workpiece changing by hand is possible in an operator-friendly manner.

According to the invention this object is achieved by the fact that a removal mechanism for workpieces, which after completion of the machining process removes the machined workpiece from the receptacle and holds it ready at a distance therefrom for exchanging, is provided in the working space.

The object underlying the invention is thereby completely achieved.

Specifically, the inventors of this application have recognized that by means of a removal mechanism of this kind it is possible to distance the machined workpiece from the receptacle after completion of the machining process but leave it in the working space, from which it is removed by an operator after the latter has first placed a new workpiece onto the receptacle. It is now possible, in a single operation, to place the new onto the receptacle and, so to speak, bring the already machined workpiece along while pulling out of the working space.

Since the machined workpiece is held at a distance from the receptacle in the working space, the cutting fluid can drip off it during this holding time, so that the soiling problem is also greatly reduced.

Because of the reduced number of operations during the workpiece change, a much shorter workpiece-to-workpiece time also results, so that overall, a greater number of workpieces can be machined with the new machine tool per unit time without thereby leading to greater stress on the operator. On the contrary, the new machine tool is in fact much more operator-friendly than the known machine tool, since the number of operations is smaller.

In an embodiment, it is preferred if an automatic flushing apparatus is provided which flushes the machined workpiece and/or, after removal thereof from the receptacle, the receptacle itself.

The advantage here is that the number of operations which the operator must perform for the workpiece change is reduced by one operation. After completion of the machining process, first the machined workpiece still present in the receptacle is flushed, before it is then, after automatic opening of the receptacle, removed from the receptacle by the removal mechanism. Thereupon the receptacle itself is also flushed. Since these flushing processes occur automatically, the entire flushing operation takes place with high reproducibility, so that the danger of remaining chips on the machined workpiece and/or the receptacle is greatly reduced, which leads on the whole to high machining accuracy in the case of the new machine tool.

Once these flushing operations have been completed, the operator door is opened, whereupon the operator then places a new workpiece onto the receptacle, where it is preferably automatically clamped in. In the same operation, the operator then grasps the workpiece present in the removal mechanism and "pulls" himself, together with the machined workpiece, back out of the working space. In other words, only one operation is necessary in order to exchange a workpiece on the new machine tool, so that even faster and more reliable workpiece changing becomes possible.

Compared with automatic workpiece changing mechanisms which, as described above, operate through the operator door, the removal mechanism newly created here is not only of much more economical and physically simple design, but because of its arrangement in the interior of the working space of the machine tool, collisions with the operator also cannot occur, so that the operating safety of the new machine tool is also increased as compared with known machine tools having automatic workpiece changing mechanisms.

Because only simple manipulations are required for workpiece changing, the acceptance of this new machine tool is also very high; in addition, it should particularly be pointed out that specially trained personnel are not required. The latter advantages mean that workpiece costs can be reduced.

In an embodiment, it is preferred if the removal mechanism grasps onto the machined workpiece present in the receptacle from above, preferably obliquely from above.

The advantage here is that the new removal mechanism can also be retrofitted to existing machine tools with no need for design changes in particular to the workpiece table. The reason is that in every machine tool a certain redundant space in which the removal mechanism can be arranged is still present above the workpiece table. If, in this context, the removal mechanism grasps onto the machined workpiece obliquely from above, provision can be made by means of this arrangement for collisions not to occur with the spindle head of the machine tool that, in known fashion, must travel to various positions in the working space in order to machine the workpieces.

This arrangement is of particular advantage, however, in the case of machine tools which have a workpiece table that is divided into a loading side and a machining side. In machine tools of this kind, workpiece changing takes place on the workpiece table either by the fact that the workpiece table is rotated 180 degrees one way and then back, or by the fact that a relative longitudinal movement occurs between workpiece table and spindle head, as is the case in so-called long-bed machines.

In all these cases in which the workpiece table is moved between machining operations on two workpieces, it is particularly easy to grasp onto the new removal mechanism from above, since no design changes need to be made on the workpiece table itself.

It is preferred in general if the removal mechanism comprises a holding mechanism for the workpiece which is shiftable by means of a displacement mechanism between an engagement position on the receptacle and a rest position above the receptacle, the holding mechanism preferably automatically coming into engagement with the machined workpiece upon shifting into the engagement position.

This feature is advantageous in terms of design: simply by moving the holding mechanism toward the receptacle, it comes into engagement with the machined workpiece, so that when the holding mechanism is pulled back into the rest position, the workpiece is taken off the receptacle. Because the rest position is provided above the receptacle, the latter is freely accessible to the operator for putting the next workpiece in place. A further advantage of the removal mechanism which grasps on obliquely from above results here from the fact that with the holding mechanism in the rest position, the workpiece does not hang directly vertically above the receptacle, so that dripping cutting fluid cannot soil either the receptacle or the operator.

It is particularly preferred in this context if the holding mechanism, in its rest position, makes the machined workpiece available in freely hanging fashion, such that it preferably comprises at least one spring-loaded hook which, upon shifting of the holding mechanism into the engagement position, automatically comes into engagement with the machined workpiece.

The advantage here is that no further manipulations are necessary for removal of the workpiece from the holding mechanism; the workpiece hangs, so to speak, from the hook, from which it can be removed. Because of the small number of manipulations which the operator, who has leaned through the opening into the working space, must perform therein, the new machine tool equipped in this fashion allows an even faster workpiece change.

It is generally preferred if the removal mechanism comprises a locking mechanism which holds the holding mechanism positively in its rest position.

This feature is advantageous in terms of safety: whether or not a workpiece is being received, the holding mechanism is held securely in its rest position, since the positive engagement can be released only actively. It is possible to provide for this purpose, for example, a hook that must be actuated by means of a piston-cylinder unit in order to release the holding mechanism. Said hook can be spring-loaded, so that the holding mechanism is automatically positively gripped as it travels into its rest position.

In this connection, it is preferred if the locking mechanism comprises a spring-loaded hook that can be brought out of engagement with the holding mechanism by means of a piston-cylinder unit.

It is generally preferred if the removal mechanism is designed for simultaneous removal of two or more concurrently machined workpieces.

The advantage here is that the machine tool first machines the workpieces before the latter are then exchanged with the aid of the removal mechanism.

It is further preferred if the displacement mechanism has a support structure, attached to the machine tool, on which the holding mechanism is mounted, preferably by means of a piston-cylinder unit, displaceably between two end locations, the removal mechanism preferably having at least one damping member which damps the movement of the holding mechanism as it approaches its engagement and/or rest position.

This feature is advantageous on the one hand in terms of design: the piston-cylinder unit simply moves its piston rod in or out, thereby moving the holding mechanism back and forth between its two end positions. The damping member, which for example may be a simple shock absorber, is provided so that the holding mechanism does not bounce too severely when arriving at end stops, and does not cause impacts. The advantage of the use of this damping member is that despite very rapid movements of the holding mechanism, soft deceleration in the end locations is possible, so that the freely hanging workpiece cannot be thrown off the hook.

It is further preferred if the working space is closed off by its rest position, holds the machined workpiece in the vicinity of the opening.

The advantage here is that the operator does not need to reach unnecessarily far into the working space in order to grasp the already machined workpiece after the new workpiece has been put in place.

The new machine tool makes it possible overall to perform a workpiece change very quickly. One contributing factor is simplified operation of the machine tool, to which end only one operation per tool change is necessary. In addition, the workpiece changing time is reduced by the fact that the removal mechanism can operate very quickly, due in particular to the fact that the piston-cylinder unit having the damping member is used for drive purposes.

Compared with known machine tools which comprise automatic workpiece changing mechanisms, the result with the new machine tool is thus a much shorter workpiece-to-workpiece time, since the automatic workpiece changing mechanisms which engage through the operator door into the working space entail a relatively long changing time due to their complicated movements.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained in more detail in the description below. In the drawings.

DETAILED DESCRIPTION OF A PREFERRED EMBODIMENT

Figure 1:
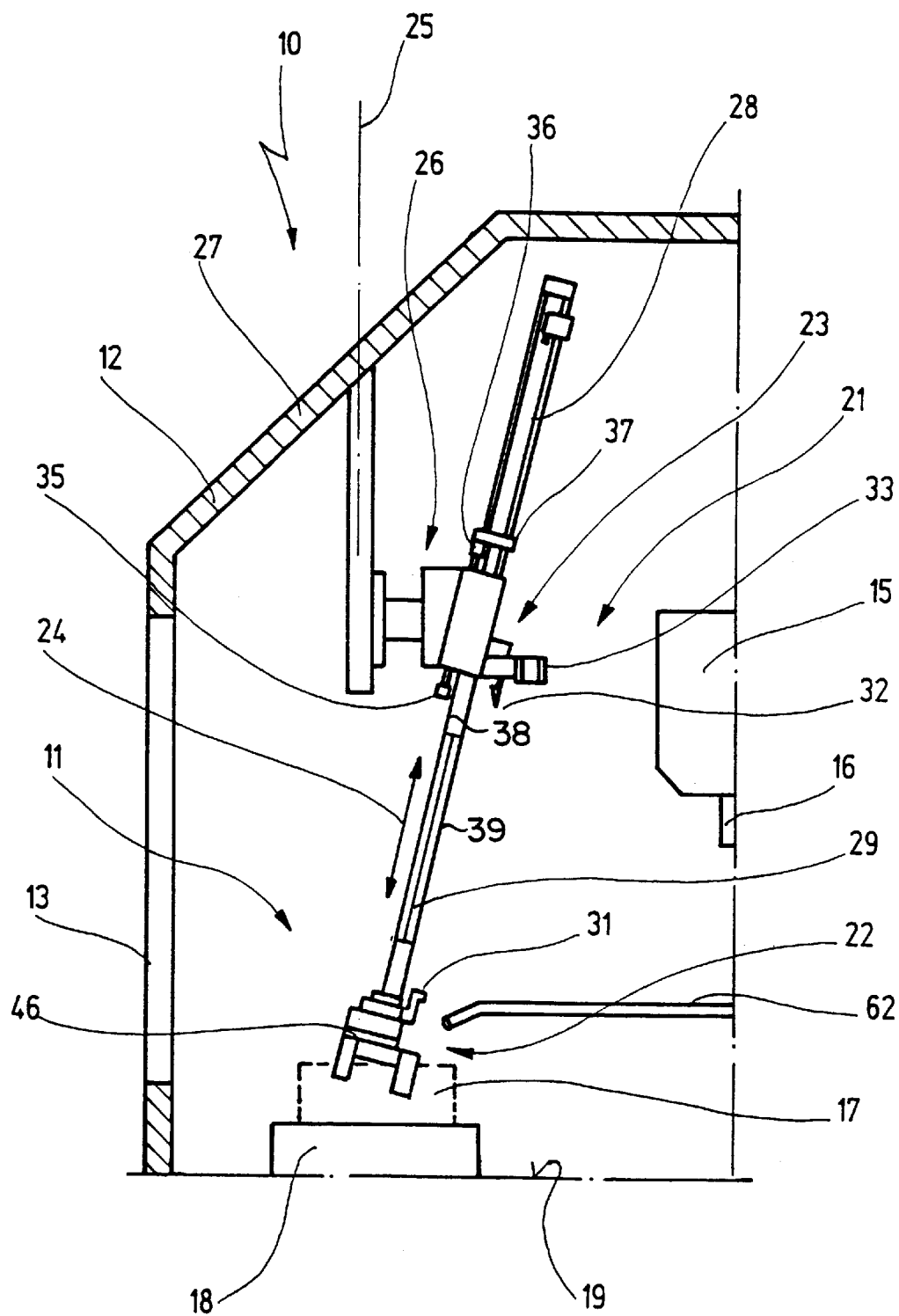
FIG. 1 shows, in a schematic side view, the new machine tool with removal mechanism for workpieces.

In FIG. 1, the number 10 generally designates a very schematically indicated machine tool which has a working space 11 that is closed off by cover panels 12. Provided in cover panels 12 is an opening which is usually closed off by an operator door that, for reasons of clarity, is not shown in FIG. 1.

Located in working space 11 is a spindle head 15, also indicated only schematically, having a tool 16 for machining a workpiece 17, also indicated schematically, that is received in a receptacle 18. Said receptacle 18 is located on a workpiece table 19 depicted in indicative fashion.

In a manner known per se, spindle head 15 can be moved relative to workpiece 17 in all three directions of the Cartesian coordinate system inside working space 11, in order to perform any desired operations on workpiece 17.

As soon as this machining process is complete, a removal mechanism 21 comes into use which grasps obliquely from above, with a holding mechanism 22, onto workpiece 17 present in receptacle 18. For this purpose, a displacement mechanism 23 is provided for holding mechanism 22, moving the latter in the direction of a double arrow 24. The removal mechanism grasps onto workpiece 17 obliquely from the right and above in FIG. 1, although it is also possible to arrange it rotated 180 degrees about a vertical axis 25, so that it approaches workpiece 17 downward and to the right, from obliquely above and to the left.

In the position shown in FIG. 1, removal mechanism 22 is in its lower engagement position, in which it is coming automatically into engagement, in a manner yet to described, with workpiece 17. Holding mechanism 22 is then moved by displacement mechanism 23 upward in the direction of arrow 24, where it attains its rest position above receptacle 18 and off set with respect thereto.

Displacement mechanism 23 comprises a support structure 26 which is attached to a wall 27 of machine tool 10. Sitting on this support structure 26 is a piston-cylinder unit 28, the piston rod 29 of which is joined to holding mechanism 22.

A locking mechanism, which comprises a hook 31 on holding mechanism 22 as well as a further hook 32 in the region of support structure 26, is provided between holding mechanism 22 and displacement mechanism 23. While hook 31 is arranged immovably, hook 32 is spring-loaded and deflects to the right in FIG. 1 when approached by hook 31 until it can snap back into the position shown in FIG. 1, the two hooks 31 and 32 then being in mutual engagement. Holding mechanism 22 is thereby held positively in the rest position.

Provided for unlocking purposes is a piston-cylinder unit 33, schematically indicated in FIG. 1, which pivots hook 32 back to the right in FIG. 1 when piston rod 29 is to be extended in order to bring holding mechanism 22 into its engagement position in which it automatically comes into engagement with workpiece 17.

Also depicted on support structure 26 are two damping members 35, 36 which in the simplest case are shock absorbers. Lower damping member 35 comes into contact with holding mechanism 22 when th e latter moves into its rest position, thus providing damping of the movement of holding mechanism 22 obliquely upward to the right in FIG. 1, so that the latter is decelerated softly. This prevents the occurrence of severe impacts, which could cause holding mechanism 22 to lose its hold on workpiece 17.

Figure 2:
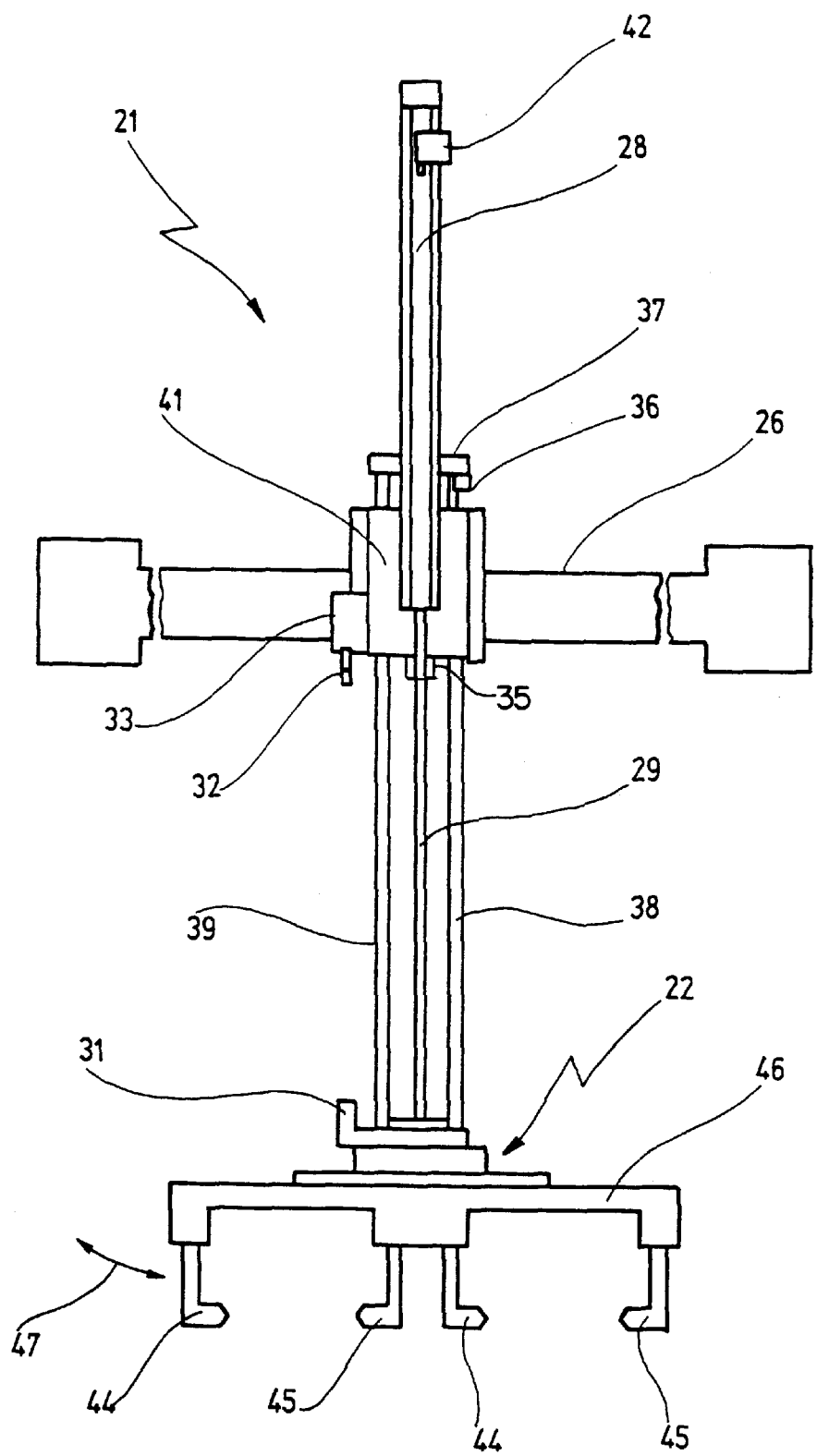
FIG. 2 shows a plan view of the removal mechanism in FIG. 1, seen from the right.

Upper damping member 36 coacts with a cross brace 37 whose function is more evident from FIG. 2.

In FIG. 2, removal mechanism 21 of FIG. 1 is shown in a plan view from the right. It is evident that cross brace 37 interconnects two guide rods 38, 39 at their upper ends, said guide rods 38, 39 being guided in a guide element 41 that is part of support structure 26.

The two guide rods 38 and 39 are arranged on either side of piston rod 29 and provide greater mechanical rigidity for displacement mechanism 23, so that even when heavy workpieces are received, they do not cause piston rod 29 to be loaded so as to bend.

An additional end stop 42, which reaches cross brace 37 when lower damping member 35 has been completely retracted, is additionally provided at the upper end of piston-cylinder unit 28.

Holding mechanism 22 comprises two pairs of hooks 44, 45 which are arranged on a crossmember 46 pivotably in the direction of an arrow 47. Each two hooks 44, 45 serve to grip a machined workpiece 17. It should also be noted that depending on the shape of workpiece 17 being gripped, a single hook may also suffice; this engages into a corresponding opening of the workpiece and suspends it in hanging fashion so that it can easily be re moved by th e operator.

Figure 3:
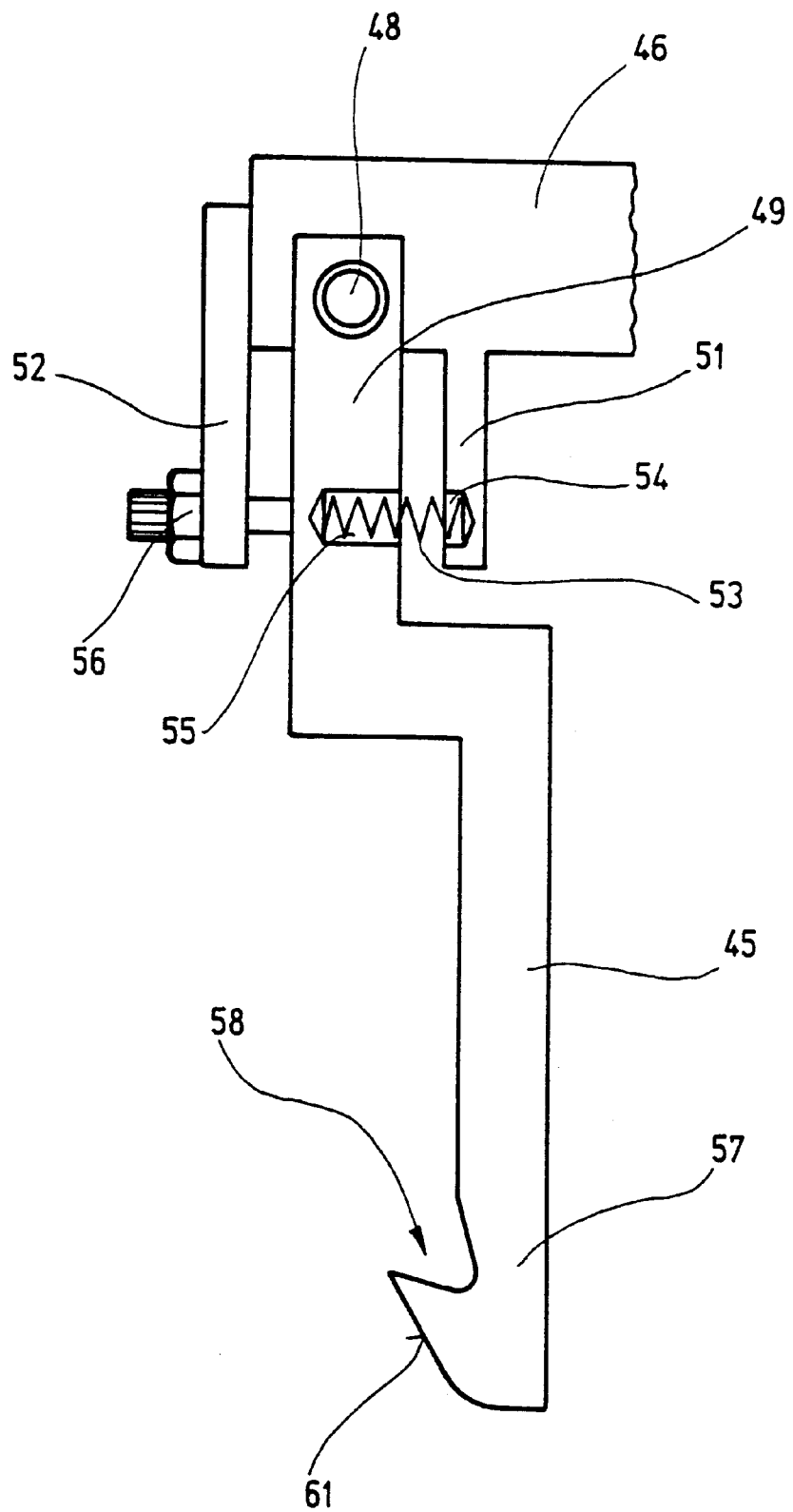
FIG. 3 shows a spring-loaded hook used in the removal mechanism of FIGS. 1 and 2.

FIG. 3 shows, in an embodiment, how hook 45 is articulated on crossmember 46.

Hook 45 is arranged, by means of a pivot mount 48 that engages at its upper end, pivotably on crossmember 46. Two extension arms 51 and 52 extend downward from crossmember 46 on either side of upper end 49 of hook 45.

provided between extension arm 51 and upper end 49 of hook 45 is a compression spring 53 which sits at one end in a blind hole 54 in extension arm 51, and at the other end in a bind hole 55 in upper end 49 of hook 45. Hook 45 is pushed thereby to the left in FIG. 3.

An adjusting screw 56, which sits in second extension arm 52, engages on the opposite side of upper end 49 of hook 45.

Adjusting screw 56 defines the end position of hook 45 into which it is pushed by compression spring 53.

At its lower end 57, hook 45 has an indentation 58 for swinging suspension of a workpiece. Provided remote from indentation 58, and pointing downward in FIG. 3, is a guide bevel 61 which extends at a slope such that pressure on said guide bevel 61 causes the hook to be pivoted to the right in FIG. 3 against the force of compression spring 53. The purpose of said guide bevel 61 is to pivot the hook automatically aside upon displacement toward a workpiece that is to be received., for which purpose guide bevel 61 slides along a surface or edge of workpiece 17. As soon as hook 45 has penetrated far enough into workpiece 17, guide bevel 61 is again unconstrained and the hook pivots back into the position shown in FIG. 3, indentation 58 coming into engagement with the corresponding projection of the workpiece.

Automatic removal mechanism 21 described so far now makes it possible, after machining of a workpiece 17, for the latter to be removed from the, for example, automatically released receptacle 18 and held above and at an offset from the latter until an operator has first, through opening 13, placed a new workpiece 17 on receptacle 18 before then removing the already machined workpiece 17 from hook 44, 45.

Returning to FIG. 1, reference will now be made to a flushing mechanism 62 which is indicated only schematically therein. Said flushing mechanism is used when machining of workpiece 17 has been completed, so as first of all to clean cutting chips off workpiece 17. Removal mechanism 21 then removes workpiece 17 from receptacle, which thereupon is also cleaned by flushing mechanism 62. Only now is the operator door opened, whereupon manual workpiece changing is possible as already described above.

Because the machined workpiece 17 located in the rest position of holding mechanism 22 is not directly above receptacle 18, the latter cannot be contaminated by chips or dripping cutting fluid falling from workpiece 17. Because of this offset arrangement, an operator placing a new workpiece onto receptacle 18 also does not get soiled. When the operator ultimately removes workpiece 17 from holding mechanism 22, much of the cutting fluid has dripped off said workpiece 17, so that in this manner as well, soiling of the operator is prevented.

We claim:

1. A machine tool having a working space in which a receptacle is provided for workpieces to be machined and to be exchanged after completion of a machine process, wherein a removal mechanism for workpieces is provided in the working space, the removal mechanism comprising a holding mechanism for the workpiece which is shiftable by means of a displacement mechanism between an engagement position on the receptacle and a rest position above the receptacle, the removal mechanism comprising a locking mechanism which holds the holding mechanism positively in its rest position, the locking mechanism comprising a spring-loaded hook that can be brought out of engagement with the holding mechanism by means of a piston-cylinder unit, whereby after completion of the machining process said removal mechanism removes the machined workpiece from the receptacle and holds it at a distance therefrom ready to be removed from the working space by an operator.

2. The machine tool of claim 1, wherein the holding mechanism comprises holding means for simultaneous removal of two or more concurrently machined workpieces.

3. The machine tool of claim 1, wherein the displacement mechanism has a support structure, attached to the machine tool, on which the holding mechanism is mounted by means of a piston-cylinder unit, displaceably between two end locations.

4. The machine tool of claim 1, wherein the removal mechanism has at least one damping member cooperating with an abutment member of the holding mechanism such that it damps the movement of the holding mechanism as it approaches its engagement or rest position.

5. The machine tool of claim 1, wherein the working space is closed off by cover panels in which an opening that is closable with an operator door is provided, and the holding mechanism, in its rest position, holds the machined workpiece in the vicinity of the opening.

6. The machine tool of claim 1, wherein an automatic flushing apparatus is provided which flushes the machined workpiece and/or, after removal thereof from the receptacle, the receptacle.

* * * * *

UNITED STATES PATENT AND TRADEMARK OFFICE
CERTIFICATE OF CORRECTION

PATENT NO. : 5,927,930
DATED : July 27, 1999
INVENTOR(S) : Deufel, et al.

It is certified that error appears in the above-identified patent and that said Letters Patent is hereby corrected as shown below:

On the cover page of the patent, after the identification of the inventors and before the application number, insert:

[73]   Assignee: Chiron-Werke GMBH & Co. KG
       Tuttlingen, Germany

Signed and Sealed this

Twenty-first Day of December, 1999

Attest:

Q. TODD DICKINSON

*Attesting Officer*    *Acting Commissioner of Patents and Trademarks*